United States Patent [19]

Ardon

[11] Patent Number: 5,371,781
[45] Date of Patent: Dec. 6, 1994

[54] SYSTEM AND METHOD FOR IDENTIFYING THE INCOMING DIRECTORY NUMBER WHEN MULTIPLE DIRECTORY NUMBERS ARE ASSIGNED TO ONE WIRELESS DEVICE

[75] Inventor: Menachem T. Ardon, Naperville, Ill.

[73] Assignee: At&T Corp., Murray Hill, N.J.

[21] Appl. No.: 129,937

[22] Filed: Sep. 30, 1993

[51] Int. Cl.[5] .......................................... H04M 11/00
[52] U.S. Cl. ......................................... 379/59; 379/58
[58] Field of Search ....................... 379/58, 59, 61, 63, 379/142; 455/33.1, 33.2, 54.1

[56] References Cited

U.S. PATENT DOCUMENTS 4,538,029 8/1985 Gazzoli et al. ......................... 379/61
4,768,218 8/1988 Yorita ..................................... 379/61

Primary Examiner—Curtis Kuntz
Assistant Examiner—Michael B. Chernoff
Attorney, Agent, or Firm—Michael B. Johannesen

[57] ABSTRACT

A system and method for delivering called party identification to a called telephone wireless station set during paging of the called wireless telephone, or, advantageously, after call set up but before ringing starts. A control unit then may cause the called line to be displayed, may cause a distinctive ring to be made, or take other action depending upon its program.

15 Claims, 1 Drawing Sheet

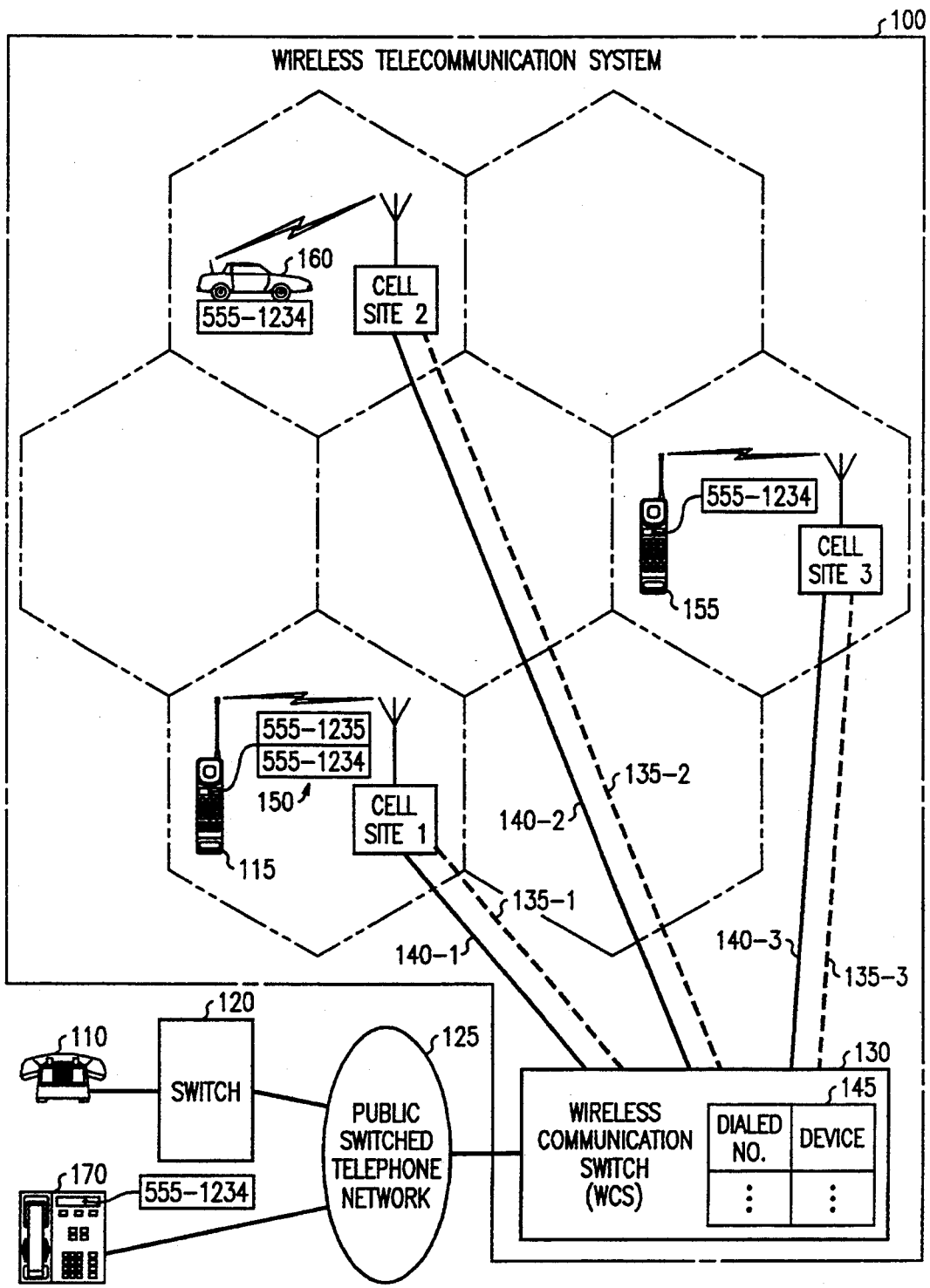

SYSTEM AND METHOD FOR IDENTIFYING THE INCOMING DIRECTORY NUMBER WHEN MULTIPLE DIRECTORY NUMBERS ARE ASSIGNED TO ONE WIRELESS DEVICE

TECHNICAL FIELD

This invention relates to the field of wireless communication systems, and, more specifically, to an arrangement for providing the terminating called line identification (TCLID) to a wireless communications device in order to alert the user as to which of a plurality of directory numbers is being called.

BACKGROUND OF THE INVENTION

With the expansion of wireless communication and the development of wireless personal communications services, more people are using wireless communications devices as their primary telephone for both personal and business use. As such wireless usage expands, it is increasingly important to provide wireless customers with the same types of features available to line-based home and business telephone customers. One feature that is not available to wireless users is having multiple directory numbers terminate to the same telephone.

Most businesses, and many homes, have multiple directory numbers (DNs) that terminate at the telephones in the location. In these systems, each DN is associated with a line (a pair of wires) that physically come into the premises. Generally, a line-based system automatically identifies which of the multiple lines is ringing. In a business, a multibutton keyset shows the user which line is ringing by lighting a button ("key") associated with the tinging line. In a residential setting, each line has its own bell that the user can audibly identify. While it is theoretically possible to have a wireless communications device with several telephone numbers, it is currently not possible to distinguish which one is tinging.

Additionally, business customers frequently use a "call pickup" feature. Call pickup is simply answering a ringing telephone from another phone. Call pickup is practical in offices that have several telephones physically located near each other, so that the ringing telephone can be heard. A person who hears the ringing phone can enter a code into a second phone and the call is transferred to the second phone. This is not possible in current wireless systems, as call pickup is not available. When wireless phones are not physically co-located, there is no means of alerting a person to the fact that another phone is tinging.

Accordingly, a need exists in the art to provide a user of wireless telephone equipment that has a plurality of DNs a means to identify which DN is being called, and a need exists to alert multiple phones (that share DNs with other phones) so that a call can be picked up and inform the users which phone is ringing.

SUMMARY OF THE INVENTION

This problem is solved and a technical advance is achieved in the art by a system and method that provides notification of information relating to an incoming call to a called wireless communication device to which multiple directory numbers have been assigned. This information generally consists of the directory number of the called telephone, but may also include an extension or other code, and may include the calling party number. This invention comprises a system and method for delivering the terminating called party identification (TCLID) to the called wireless telephone set during paging of the called wireless telephone, as part of the ringing message, as a separate message, or the information may be added to any other of the existing setup messages. Alternatively, the called directory number (TCLID) may be delivered in the audio band by delivering an audio signal, such as DTMF, to the called telephone station set shortly before the ring-start message. The TCLID signal may be encrypted so that the information is not available to others who may be monitoring the channel. In the audio signaling embodiment, a converter at the wireless device receives the signal and translates it. A control unit in the wireless device then causes the TCLID to be displayed, causes a distinctive ringing to be made, or takes other action depending upon its program. This invention may also be used to provide wireless devices with an equivalent of keyset service and to provide call pickup in a wireless environment.

BRIEF DESCRIPTION OF THE DRAWING

A more complete understanding of the invention may be obtained from a consideration of the following Detailed Description in conjunction with the drawing, in which the drawing is a block diagram illustrating the principles of this invention in the context of a wireless mobile communication system.

DETAILED DESCRIPTION

The drawing shows a simplified block diagram of a wireless telecommunication system 100 illustrating the principles of this invention. This invention will be described with reference to a particular example where telephone 110 makes a call to mobile station 115. Mobile station 115 is, in this example, a personal communication device, but may also be a cellular car telephone or any digital or analog wireless communication device that has multiple directory numbers associated with it, which operates in a wireless communication system such as system 100. The user of telephone 110 enters one of the plurality of telephone numbers associated with wireless communication device 115, for example, 555-1235, into telephone 110. This destination directory number is received at switch 120 which routes the call into the public switched telephone network (PSTN) 125. Because the dialed number corresponds to a wireless station in system 100, PSTN 125 routes the call to wireless communication system 100. Wireless communication system 100 comprises a plurality of cells connected to a wireless communication switch 130 via data links 135-1,135-2, and 135-3 for exchanging messages and communication path trunks 140-1,140-2, and 140-3 for voice data transmission. Wireless communication system 100 is, in the preferred embodiment, a distributed processing cellular telecommunication switching system, such as an AT&T Autoplex® System 1000. Each cell includes a base station such as an AT&T Autoplex Series 2 intelligent base station 2000.

In response to receipt of the incoming telephone call at wireless communication switch (WCS) 130, WCS 130 first determines which wireless communication device this call is for by performing a table lookup in table 145 in the figure using the dialed directory number CDN). WCS 130 determines that this particular DN, "555-1235," is associated with wireless device 115 as shown in the example of Table I.

TABLE I

| Dialed Directory Number | Device |
|---|---|
| . | . |
| . | . |
| . | . |
| 555-1234 | 115 |
|  | 155 |
|  | 160 |
| 555-1235 | 115 |
| 555-8772 | 115 |
| 555-4242 | 115 |
| . | . |
| . | . |
| . | . |

WCS 130 sends a paging message via data links 135-1, 135-2, and 135-3 to all cell sites to cause the cell sites to determine if wireless communication device 115 is active in wireless communication system 100 and, if so, which cell is the best serving cell.

In response to the page message, wireless device 115 sends a page response message, as is known in the art. In this particular example, wireless communication device 115 is located in cell 1. Cell site 1 receives the page response message from wireless device 115 and forwards it via data link 135-1 to wireless communication switch 130. A radio channel linking the cell site to wireless communication device 115 is then assigned, a message is sent to wireless communication device 115 informing it of the radio channel. An acknowledgement message is sent back from wireless communication device 115 to cell site 1. A message is then sent to wireless communication device 115 to start ringing.

According to this invention, wireless communication device 115 is informed of the terminating called line identification CTCLID) of this call during or, advantageously, prior to ringing. This is similar in scope to the invention described in M. T. Ardon's U.S. patent application Ser. No. 08/026,919, filed Mar. 5, 1993, which is incorporated herein by reference. In the prior art, the destination directory number is delivered from switch 120 through PSTN 125 to wireless communication switch 130, which then performs a translation using the destination directory number to identify the destination equipment. No further use is made of the directory number. According to this invention, wireless communication switch 130 forwards the destination directory number as a TCLID to wireless communication device 115. This may be accomplished in one of several different ways. First, the TCLID may be delivered with the paging message as an optional field in the message. Alternatively, the TCLID may be delivered as an optional field in the communication channel assignment message, in the begin-ringing message, or in a separate TCLID message. Also, the TCLID may be encrypted (by an encrypting device at switch 130 and a decrypting device at wireless communication device 115) so that privacy to the receiving party may be maintained.

In a further embodiment, after a radio channel has been assigned, an analog encoded signal, such as dual-tone, multifrequency (DTMF) encoding of the directory number may be delivered to wireless communication device 115 over the radio communications channel. The analog encoded directory number is then translated (decoded) back into digits and/or alpha numeric characters identifying names, groups, etc., and displayed at telephone 115 on display 150. Alternatively, frequency shift key signaling and conversion of TCLID could be used, as disclosed in M. T. Ardon's U.S. patent application Ser. No. 08/026,919, which was previously referenced.

Regardless of which method is used to transfer the destination directory number to wireless communication device I 15, the destination directory number is displayed on display 150 as "555-1235" of wireless communication device 115. In this manner, multiple directory numbers may be associated with wireless communication device 115, and the user can determine which directory number the call is for.

Call waiting for cellular telephones with more than one DN may be implemented unambiguously by using this invention to uniquely identify the destination telephone number of the waiting call. For example, when a call comes in to switch 130 for one of the DNs associated with wireless communication device 115, and wireless communication device 115 is already busy on another call, switch 130 sends a call waiting alert to wireless communication device 115 on a signaling channel, which causes it to generate a call waiting signal. At approximately the same time, a message containing the TCLID or an analog encoded TCLID may be sent to device 115, which then translates it and displays it on display 150, which uniquely identifies the called DN.

Further, the incoming calling line identification (ICLID) may also be delivered to wireless communication device 115, as part of normal call setup or as part of call waiting. In either case, the ICLID may be delivered on a radio channel as a DTMF or an FSK encoded signal as described in Doughty, U.S. Pat. No. 4,582,956, which issued Apr. 15, 1986, as part of any of the standard cellular messages, or as a separate transmission. The ICLID may be displayed simultaneously with the TCLID, or the display may alternate between the two.

By use of this invention, .a virtual office may be set up in distributed locations using wireless technology. For example, in the prior art a real estate office had a fixed location with a plurality of agents and a plurality of multi-button keysets. The office has a plurality of telephone numbers on which any of the agents may be reached. However, most agents now spend most of their time away from the office with cellular wireless telephones, and cannot have the advantages of multi-button keysets.

According to this invention, however, each call delivered to wireless communication switch 130 may be distributed to a plurality of cellular communication devices. Therefore, in an example, "555-1234" is dialed at telephone 110, which is delivered by switch 120 to PSTN 125. PSTN 125 delivers the call to wireless communication switch 130 which performs a lookup in table 145 to determine which systems to deliver the message to. In this example, table 145 may resemble Table I.

In this example, wireless communication switch 130 determines that the call is to be delivered to wireless communication devices 115 and 155, and to car telephone 160, all three of which share the common DN 555-1234 (and possibly others as well). WCS 130 sends out paging messages to determine the location and the best serving cell for all of these systems. These systems respond with the page response and communication channels may be assigned to all of the systems, if such channels are available.

According to the teachings of this invention, the destination directory number ("555-1234") is delivered to all three wireless communication devices 115, 155, and 160, so that the user of each knows which of the possible directory numbers the call is for. Of course, the number could be translated to a name or code, which serves the same purpose of identifying which DN was being called. The abovedescribed system corresponds to having a multi-button keyset wherein a light associated with a particular directory number is illuminated when that particular directory number has an active call on it. According to this embodiment, the call is delivered to the first device that answers. In this manner, a cellular equivalent of a multi-button keyset may be implemented.

Additionally, a virtual office group may include wire-line telephone 170 along with wireless devices 115, 155, and 160. According to this embodiment, the call is distributed to wire-line telephone 170 and wireless communication system 1130 according to the teaching of Harlow, et al., U.S. Pat. No. 5,206,901, which issued on Apr. 27, 1993, and is incorporated herein by reference. Telephone 170 may be informed of the TCLID according to the teaching of Ardon, U.S. patent application Ser. No. 08/026,919, discussed above, or Ardon, U.S. patent application Ser. No. 08/026,952 entitled "Analog Multibutton Telephone Keysets," filed Mar. 5, 1993, and incorporated herein by reference.

A call pickup feature may be implemented for cellular devices by using this invention. In this embodiment, a call is set up to cellular device 115, as described above. A complete path is set up to wireless communication switch 130 and extended to cell site 1 in anticipation of completing a call to wireless communication device 115. At the same time this setup is going on, messages are sent to other wireless and/or wire line devices in the call pickup group for wireless device 115. For example, a call pickup group for wireless device 115 could include wireless device 155 and wire line telephone 170. While the call is being set up to wireless device 115, a message is sent from switch 130 to cell site 3 which broadcasts the message to wireless device 155. Also, a message is sent through PSTN 125 to telephone 170. The messages include the TCLID of the call going to wireless device 115 (which, in this example, is 555-1234). Wireless devices 155 and 170 display the TCLID (555-1234) and provide some form of alert, for example, a "ping ring" or other signal which indicates a call pickup call. The user of telephone 170 or wireless device 155 may answer this call by entering a code on their keypad which causes a message to be sent to wireless communication switch 130 to send the call to the device that signaled. A path is then set up in the normal manner to whichever device signals. Special keys may be used in place of keypad control signals by preprogramming the keys to send the code signals, as is known in the art.

Additionally, wireless device 115 may also "barge-in" on the picked-up call, as is known in the art, by sending a special code to switch 130, which causes a bridge or conference circuit to be placed on the call, and wireless device 115 added to the call, as is known in the art. If several devices show the same telephone number, then the master or lead destination telephone for a particular DN may be changed. For example, during the early morning commuting time, the primary number could be a cellular telephone mounted in car 160 and portable device 115 as a secondary alert (one that receives the ping ring). At a predetermined time, (or at a time set by the user) the lead line to which the call is initially set up is changed to portable device 115. In this manner, the lead device can be the one most convenient to the user at almost any time.

"Hunt group" services can be meaningfully deployed among wireless members of a group using this invention, as the identity of the original called number is preserved even when the call is directed to another phone. Also, an end user can simultaneously be a member of a plurality of hunt groups. With the TCLID capabilities there is no ambiguity as to the relationship of the called number to its associated group. The switch may provide to the cellular device, in addition to the called DN, an alphanumeric display to designate the hunt group or the called party name.

Each wireless system that is assigned multiple DNs or IDs (codes) which are different than the equipment number ID can support a plurality of apparatus that are activated by its own ID (code) or DN. As an example, a wireless PC modem automatically (without human interface) responds to one ID, while a facsimile equipment or alarm system interrogation can respond to a different ID. Similarly, multiple analog local wired or wireless phone could interface or "home" on a single wireless phone. In these cases, a device (such as a fax machine) may be connected via wire lines to a cellular device. When the TCLID signal is received along with the code, the fax (or other equipment) responds to its own code being included with the TCLID.

It is to be understood that the above-described embodiments are merely illustrative principles of the invention, and that many variations may be devised skilled in the art without departing from the scope of the invention. It is, therefore, intended that such variations be included within the scope of the claims.

I claim:

1. In a wireless telecommunications system, said system including a switching system and a plurality of cells, a method for identifying a called director number at a wireless communications device when multiple directory numbers are assigned to said wireless communications device, said wireless communications device usable in any of said plurality of cells and movable from cell to cell while in use, said method comprising the steps of:

receiving, in said switching system, terminating calling line identification (TCLID) signals identifying which one of the multiple directory numbers assigned to said wireless communications device has been called;

responsive to receipt of said TCLID signals identifying said one of said multiple directory numbers, said switching system using said signals to set up a call directly to said wireless communications device, and also transmitting said TCLID signals directly to said wireless communications device; and indicating at said wireless communications device which of said multiple directory numbers is the called directory number.

2. The method of claim 1 wherein said step of transmitting comprises sending said TCLID signals with a paging message to said wireless communications device, in order to locate said device, as part of said setting up of said call.

3. The method of claim 1 wherein said wireless telecommunications system pages said wireless communications device as part of call setup and said wireless communcations device rings in response to a message from said wireless telecommunications system;

wherein said step of transmitting comprises sending a separate message to said wireless communications device after paging and before said wireless communications device begins ringing.

4. The method of claim 1 wherein said step of transmitting comprises generating an audio encoding of said TCLID signals and sending it on an audio channel to said wireless communications device.

5. The method of claim 1 wherein said wireless communications device includes a display, said method further including the step of displaying said called directory number on said display of said wireless communication device.

6. The method of claim 1 wherein said wireless communications device includes an audible signaling device, wherein said step of indicating comprises audibly signaling differently for each of said multiple directory numbers responsive to said transmitted data.

7. The method of claim 1 wherein said transmitting occurs during an existing telephone call, said step of transmitting comprising the substeps of:

sending a message including said terminating directory number to said wireless communication device; and generating a call waiting alert at said wireless communications device.

8. The method of claim 7 wherein said substep of generating a call waiting alert comprises generating a different call waiting alert corresponding to each of said plurality of directory numbers responsive to said TCLID signals.

9. The method of claim 7 wherein a second message is sent to said wireless communication device comprising an incoming calling line identification (ICLID) which is decoded and displayed at said wireless communication device.

10. In a cellular telephone network, said cellular telephone network communicating with a plurality of cellular communications devices, wherein each of said cellular communications devices has a plurality of directory numbers (DNs) assigned to it, said cellular telephone network including a switching system, and a plurality of cells served by a plurality of cell sites, said plurality of cellular communications devices being usable in any of said cells, a method for delivering calls to said plurality of cellular devices comprising the steps of:

said cellular telephone network receiving an incoming call at said switching system, said incoming call including a terminating calling line identification (TCLID) signal, said switching system delivering said TCLID signal to one or more of said plurality of cellular devices via one of said cell sites;

said one ore more of said plurality of cellular devices indicating that the incoming call is for one of said plurality of directory numbers; and said cellular telephone network connecting said call to a first of said one or more of said plurality of cellular devices to indicate to said cellular telephone network to deliver said incoming call.

11. In a cellular telephone network, said cellular telephone network including a switching system and a plurality of cell sites serving a plurality of cells, said cellular telephone network supporting a plurality of cellular devices each having a plurality of directory numbers (DNs) assigned to it, said plurality of cellular devices being usable in any of said cells, and said cellular devices being organized by said switching system as a plurality of hunt groups, wherein when an incoming call is for one of said cellular devices in a hunt group and that cellular device is busy, another of said cellular devices in said hunt group is alerted to said incoming call, a method for delivering calls to said plurality of cellular devices comprising the steps of:

said cellular telephone network receiving an incoming call at said switching system, said incoming call including a terminating calling line identification (TCLID);

said switching system delivering said TCLID directly to one ore more of said plurality of cellular devices;

said cellular telephone network delivering to said one or more of said plurality of cellular devices an indication of the hunt group assigned to said call;

said one or more of said plurality of cellular devices alerting a user of said incoming call by informing said user of said TCLID and said hunt group; and said switching system connecting said incoming call to one or more of said plurality of cellular devices that signals acceptance to said cellular telephone network of said incoming call.

12. The cellular telephone network of claim 11 wherein said cellular device comprises:

means for receiving from said switching system a terminating calling line identification (TCLID) identifying one of said plurality of directory numbers; and means for communicating said information to said user.

13. The cellular telephone network of claim 11 wherein said means for receiving said information in said cellular device comprises means for receiving and translating messages from said switching system.

14. The cellular telephone network of claim 13 wherein said TCLID is transmitted via said audio signals from said switching system, and said means for receiving in said cellular device comprises means for receiving said audio signals from said switching system and translating it into a visual display.

15. The cellular telephone network of claim 11 wherein said means for communicating said information in said cellular device comprises an audible device that can indicate each of said plurality of directory numbers by a different sound.

* * * * *